(12) United States Patent
Yamaguchi et al.

(10) Patent No.: US 11,730,074 B2
(45) Date of Patent: Aug. 22, 2023

(54) WORK VEHICLE

(71) Applicant: KUBOTA CORPORATION, Osaka (JP)

(72) Inventors: Tetsuo Yamaguchi, Osaka (JP); Takudai Matsuda, Saka (JP)

(73) Assignee: KUBOTA CORPORATION, Osaka (JP)

( * ) Notice: Subject to any disclaimer, the term of this patent is extended or adjusted under 35 U.S.C. 154(b) by 256 days.

(21) Appl. No.: 17/173,227

(22) Filed: Feb. 11, 2021

(65) Prior Publication Data

US 2021/0259147 A1 Aug. 26, 2021

(30) Foreign Application Priority Data

Feb. 26, 2020 (JP) .................................. 2020-030388

(51) Int. Cl.
| | |
|---|---|
| A01B 63/10 | (2006.01) |
| A01B 59/06 | (2006.01) |
| A01B 63/118 | (2006.01) |
| A01B 76/00 | (2006.01) |

(52) U.S. Cl.
CPC ........ *A01B 63/1006* (2013.01); *A01B 59/067* (2013.01); *A01B 63/118* (2013.01); *A01B 76/00* (2013.01)

(58) Field of Classification Search
CPC .......................... A01B 63/1006; A01B 63/118
See application file for complete search history.

(56) References Cited

U.S. PATENT DOCUMENTS

| | | | |
|---|---|---|---|
| 9,360,005 | B2 | 6/2016 | Fedde et al. |
| 2012/0152642 | A1 | 6/2012 | Takahashi et al. |
| 2014/0202566 | A1 | 7/2014 | Fedde et al. |
| 2017/0089366 | A1* | 3/2017 | Fukuda et al. ........ E02F 9/2292 |
| 2019/0211528 | A1 | 7/2019 | Hita et al. |

FOREIGN PATENT DOCUMENTS

| | | |
|---|---|---|
| JP | 01-77304 U | 5/1989 |
| JP | 2001-169620 A | 6/2001 |
| JP | 2006-340621 A | 12/2006 |
| JP | 2010-268755 A | 12/2010 |
| JP | 2018-075958 A | 5/2018 |
| WO | 2011/027759 A1 | 3/2011 |

OTHER PUBLICATIONS

Official Communication issued in corresponding European Patent Application No. 21159320.7, dated Aug. 6, 2021.

* cited by examiner

*Primary Examiner* — Tara Mayo

(74) *Attorney, Agent, or Firm* — Keating and Bennett, LLP

(57) ABSTRACT

A work vehicle includes a lifting mechanism to control at least one of a height and a posture of a work machine connected to the work vehicle. The lifting mechanism is able to control at least one of the height and the posture by using a hydraulic drive. The work vehicle includes an oil-temperature acquirer to acquire an oil temperature to be used for the hydraulic drive, a maximum oil amount setter to set a maximum oil amount according to the oil temperature acquired by the oil-temperature acquirer, the maximum oil amount being a maximum value of a supply amount of oil used to drive the hydraulic drive, and a hydraulic drive controller to control the hydraulic drive below the maximum oil amount set by the maximum oil amount setter.

5 Claims, 6 Drawing Sheets

WORK VEHICLE

CROSS-REFERENCE TO RELATED APPLICATION

This application claims priority under 35 U.S.C. § 119 to Japanese Patent Application No. 2020-30388, which was filed on Feb. 26, 2020, the entire contents of which are hereby incorporated by reference.

BACKGROUND

1. Field of the Disclosure

The present disclosure relates to a work vehicle provided with a lifting mechanism capable of raising and lowering a work machine connected thereto.

2. Description of the Related Art

Work vehicles, such as tractors, are provided with a lifting mechanism for controlling the height and posture of a work machine connected thereto. The lifting mechanism includes a three-point link, for example. The three-point link includes a hydraulic system and can raise and lower the work machine connected thereto by controlling the hydraulic system.

When raising and lowering the work machine using the three-point link, an oil amount is controlled using a proportion flow-rate control valve. In detail, the work machine is raised by sending oil into a single-action lift cylinder, and is lowered by extracting the oil from the cylinder. A flow rate of the oil is proportional to a current supplied to the control valve, and is about several tens to several hundred liters per minute.

When raising and lowering the work machine using the proportion flow-rate control valve, the flow rate of the oil which is sent into the cylinder is calculated based on a deviation of the current position from a target position, for moving the work machine to the target position. If the deviation is large, the oil is sent at a large flow rate to increase an ascending speed of the three-point link, and as the deviation becomes smaller, the flow rate is reduced. Therefore, the work machine can be moved to the target position promptly and appropriately.

Moreover, JP 2010-268755A discloses a work vehicle provided with an inclination control device. The work vehicle performs an inclined posture control by selecting one of a plurality of temperature drift characteristics for a tilt sensor, and correcting a reference value of the tilt sensor.

U.S. Pat. No. 9,360,005 discloses an agricultural machinery provided with a temperature sensor which detects a temperature of fluid in a supply line. The machinery controls a flow control valve.

However, the oil used for the proportion flow rate control valve described above tends to be influenced by temperature. In detail, when the temperature falls, the viscosity of the oil increases.

Thus, when the temperature is low, the proportion flow-rate control valve is influenced by the viscosity of the oil, and it may take more time than normal to fully close the valve even if the valve receives an instruction for a close operation. Therefore, a greater amount of oil than desired may flow, and the work machine may exceed (overshoot) the target position. When the work machine exceeds the target position, it is then necessary to move backward in order to move the work machine to the target position. When this is repeated, the work machine repeats ascending and descending around the target position.

SUMMARY OF THE DISCLOSURE

Preferred embodiments of the present disclosure provide work vehicles each capable of suppressing an overshoot of a lifting mechanism.

According to one aspect of a preferred embodiment of the present disclosure, a work vehicle provided with a lifting mechanism to control at least one of a height and a posture of a work machine connected to the work vehicle, is provided. The lifting mechanism is able to control at least one of the height and the posture by using a hydraulic drive. The work vehicle includes an oil-temperature acquirer to acquire an oil temperature to be used for the hydraulic drive, a maximum oil amount setter to set a maximum oil amount according to the oil temperature acquired by the oil-temperature acquirer, the maximum oil amount being a maximum value of a supply amount of oil used to drive the hydraulic drive, and a hydraulic drive controller to control the hydraulic drive below the maximum oil amount set by the maximum oil amount setter.

According to this configuration, the maximum oil amount to be supplied to the hydraulic drive is set according to the oil temperature to be supplied to the hydraulic drive. Thus, since the maximum amount can be reduced when the oil temperature is low, for example, even when a supply valve which supplies oil to the hydraulic drive cannot be closed at a desirable timing, it becomes easy to close the valve by reducing the flow rate. Therefore, the supply valve can easily be controlled at a desirable timing. Thus, a situation in which the supply valve cannot be closed due to the viscosity of the oil even when it is time to close the supply valve is prevented, and as a result, overshoot of the lifting mechanism is able to be reduced or prevented.

In the work vehicle described above, an oil temperature sensor to detect the oil temperature may be provided at or in a vicinity of a supply valve to supply the oil to the hydraulic drive.

According this configuration, since the oil temperature sensor is provided at or in a vicinity of the supply valve configured to supply the oil to the hydraulic drive, the oil temperature close to an oil temperature actually passing the supply valve is able to be detected.

In the work vehicle described above, the oil temperature sensor may be disposed in a hydraulic circuit to drive the hydraulic drive.

According this configuration, since the oil temperature sensor is disposed in the hydraulic circuit, the oil temperature close to an oil temperature passing the supply valve is able to be detected.

In the work vehicle described above, the maximum oil amount setter may change the maximum oil amount corresponding to the oil temperature between when raising the work machine and when lowering the work machine.

Due to the effect of the gravity, etc., desirable oil amount differs between when raising and when lowering the work machine. According this configuration, since the maximum oil amount corresponding to the oil temperature is changed between when raising and lowering the work machine, suitable maximum oil amount is able to be set to each of when raising and lowering.

In the work vehicle described above, a selection of either one of an accuracy priority in which priority is given to the accuracy of a target position to which the work machine is moved and a time priority in which priority is given to a time required to move the work machine to the target position may be possible. The maximum oil amount setter may, when the accuracy priority is selected, set the maximum oil amount according to the oil temperature, and when the time priority is selected, set an allowable range permissible from the target position. The hydraulic drive controller may, when the accuracy priority is selected, control the hydraulic drive below the maximum oil amount set by the maximum oil amount setter, and when the time priority is selected, control the hydraulic drive so that the work machine moves within the allowable range at a normal oil amount.

According this configuration, either giving priority to the accuracy of the target position of the work machine or giving priority to the time required for moving the work machine to the target position is able to be selected. Moreover, when giving priority to the moving time, the work machine is moved not just to the target position but to a position within the allowable range permissible from the target position, thus, the moving time can be shortened.

According to aspects of example preferred embodiments of the present disclosure, the maximum oil amount to be supplied to the hydraulic drive is set according to the oil temperature to be supplied to the hydraulic drive. Thus, since the maximum amount is able to be reduced when the oil temperature is low, for example, even when the supply valve which supplies oil to the hydraulic drive cannot be closed at a desirable timing because of the low oil temperature and thus the viscosity of oil is high, it becomes easier to close the valve by reducing the flow rate. Therefore, the supply valve is able to easily be controlled at a desirable timing. Thus, a situation in which the supply valve cannot be closed due to the viscosity of the oil even when it is time to close the supply valve is prevented, and as a result, overshoot of the lifting mechanism is able to be reduced or prevented.

The above and other elements, features, steps, characteristics and advantages of the present invention will become more apparent from the following detailed description of the preferred embodiments with reference to the attached drawings.

BRIEF DESCRIPTION OF THE DRAWINGS

The present disclosure is illustrated by way of example and not by way of limitation in the figures of the accompanying drawings, in which like reference numerals indicate like elements in the following drawing figures.

DETAILED DESCRIPTION OF THE PREFERRED EMBODIMENTS

Preferred Embodiment 1

Figure 1:
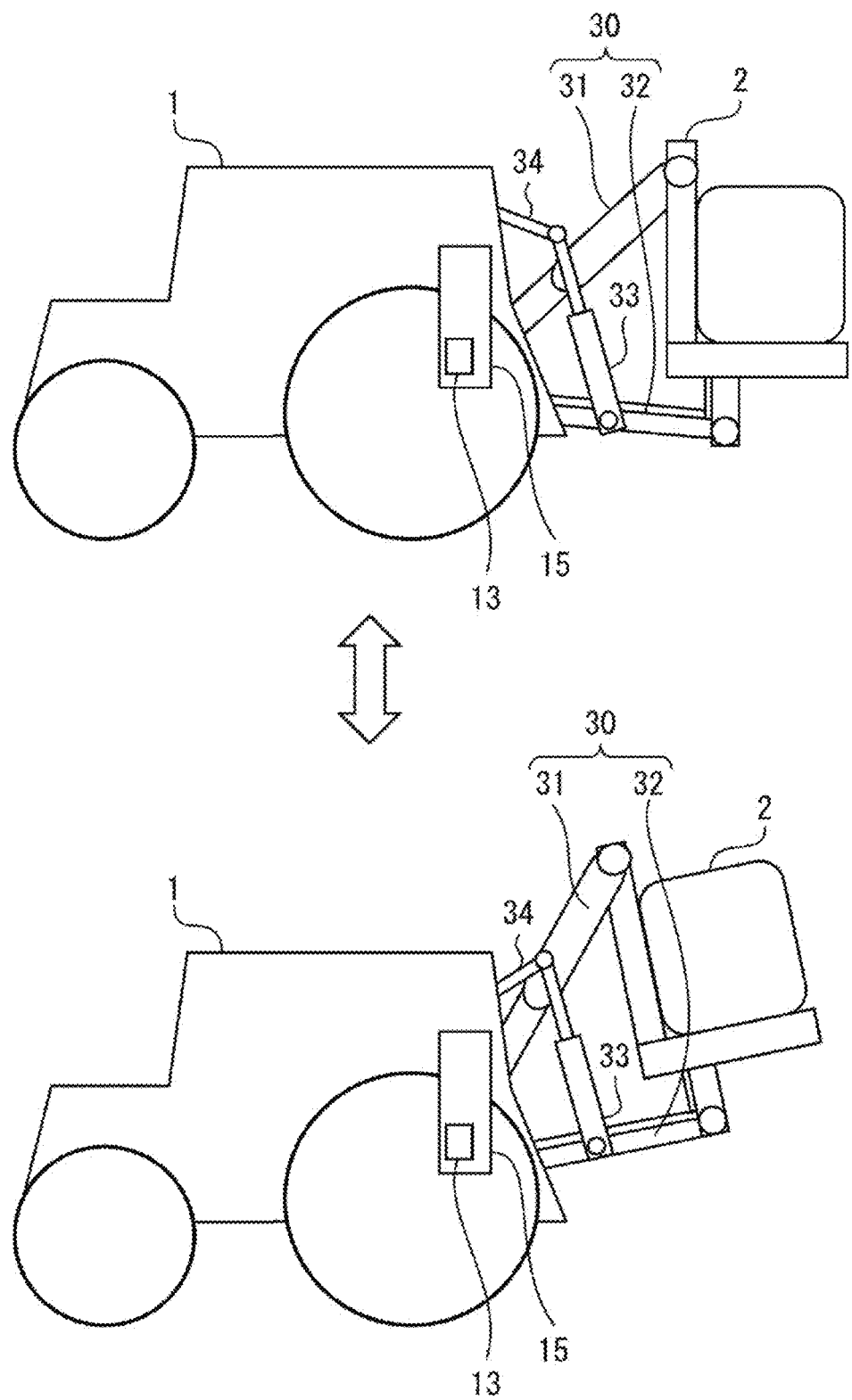
FIG. 1 is a view illustrating an outline of a tractor according to a preferred embodiment of the present invention.
Figure 2:
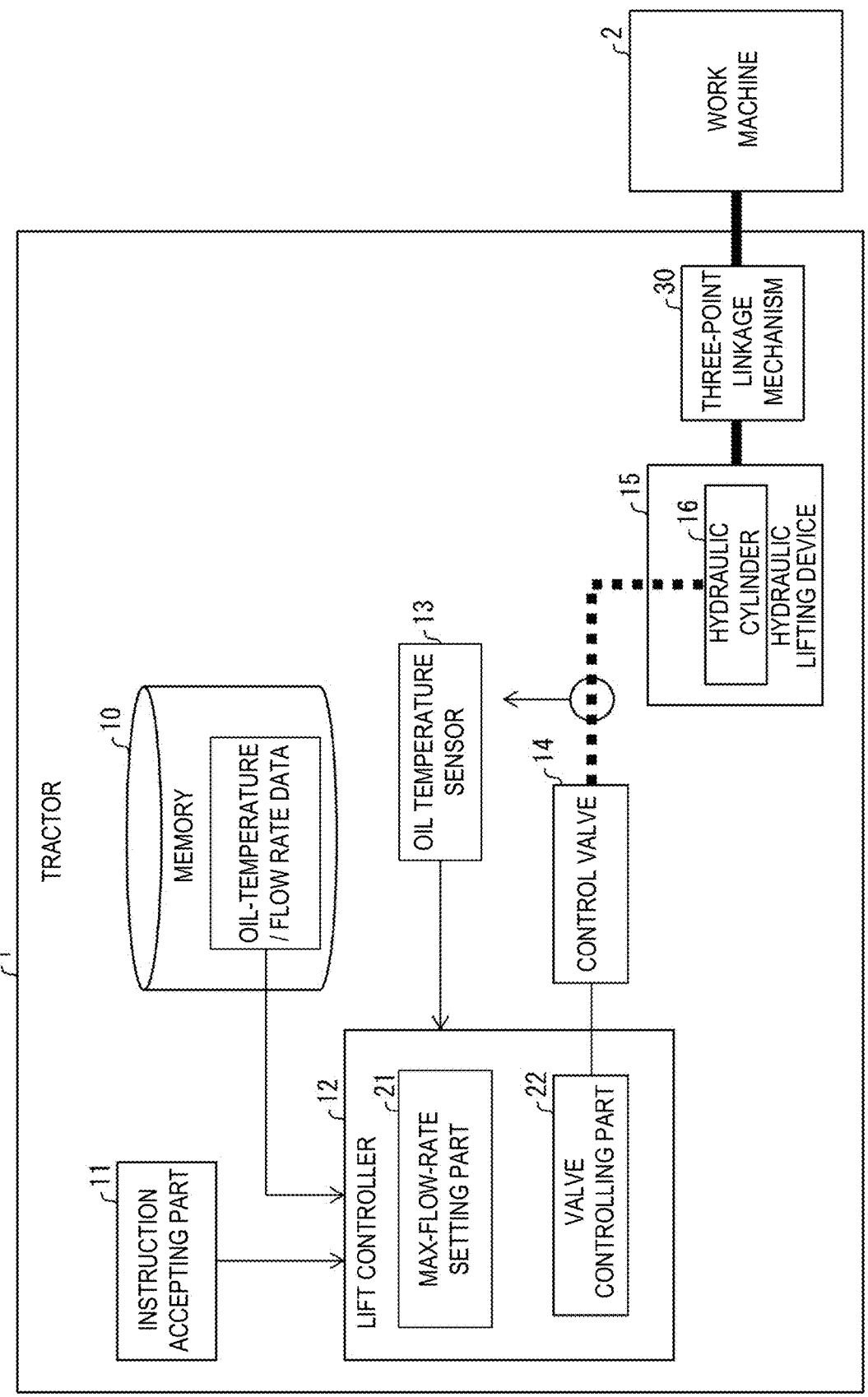
FIG. 2 is a block diagram illustrating a configuration of a portion of a tractor.

Referring to FIG. 1, an outline of a tractor 1 (work vehicle) according to a preferred embodiment of the present disclosure is first described. FIG. 1 is a view illustrating the outline of the tractor 1. As illustrated in FIG. 1, the tractor 1 is connected with a work machine 2 through a three-point linkage mechanism 30 (lifting mechanism), and the work machine 2 can be raised and lowered by the three-point linkage mechanism 30. Moreover, the three-point linkage mechanism 30 is raised and lowered by a hydraulic lifting device 15 (hydraulic drive) (FIG. 2). An upper portion of FIG. 1 indicates a state where the work machine 2 is lowered, and a lower portion of FIG. 1 indicates a state where the work machine 2 is raised.

Since normal functions of the tractor 1 as a tractor can be implemented using known technologies, the detailed description is omitted. The tractor 1 includes an engine, a clutch housing coupled to the engine, and a transmission case coupled to the clutch housing. Power from the engine is transmitted to a main transmission built in the transmission case through a main clutch built in the clutch housing, and a transmission shaft. Then, the power of which the speed is reduced by the main transmission is transmitted to front wheels and rear wheels through an auxiliary transmission inside the transmission case to propel the tractor 1.

The three-point linkage mechanism 30, which enables attachment of the work machine 2, is coupled to a rear portion of the transmission case so as to be vertically swingable. The three-point linkage mechanism 30 includes a single top link 31 and left-and-right lower links 32, and is raised and lowered together with the work machine 2 by the hydraulic lifting device 15. Moreover, the hydraulic lifting device 15 includes a pair of left-and-right lift arms 34, a lift rod 33 (lift cylinder) which suspends and supports the left-and-right lower links 32, and a hydraulic cylinder 16 which swings the lift arms 34 vertically. The hydraulic cylinder 16 is controlled by a control valve 14.

Note that the work machine 2 which is connectable through the three-point linkage mechanism 30 includes an implement for upland cropping or paddy farming.

The hydraulic lifting device 15 raises and lowers the lift arms 34 by rotating the hydraulic pump by the power of the engine and sending oil sent to the control valve 14 to the hydraulic cylinder 16, according to opening and closing of the valve. As for the hydraulic cylinder 16 which raises and lowers the lift arms 34 to lift the work machine 2, a single-action cylinder is mainly used. The single action is a structure in which oil is sent to the hydraulic cylinder 16 only when raising the work machine 2, and when lowering the work machine 2, the oil is extracted by the control valve to allow the work machine 2 to descend by its own weight.

The tractor 1 according to this preferred embodiment detects a temperature of oil which flows through the control valve 14 to control the oil sent to the hydraulic cylinder 16, and adjusts the maximum oil amount which passes through the control valve 14 according to the detected oil temperature. The oil used for the hydraulic cylinder 16 changes in the viscosity depending on the temperature, and the viscosity increases particularly under a low temperature. Therefore, if the control valve 14 is controlled similarly to the normal state when the temperature is low, the control valve 14 may not be successfully closed due to the viscosity of the oil. The tractor 1 according to this preferred embodiment solves the problem described above by adjusting a flow rate of the control valve 14 according to the oil temperature.

Next, a configuration of a portion of the tractor 1 is described with reference to FIG. 2. FIG. 2 is a block diagram illustrating the configuration of a portion of the tractor 1. Note that, since normal functions of the tractor 1 as a tractor can be implemented using known technologies as described above, here, matters related to various preferred embodiments of the present disclosure will be described.

As illustrated in FIG. 2, the tractor 1 includes a memory 10, an instruction accepting part 11, a lift controller 12 (oil-temperature acquiring part), an oil temperature sensor 13, the control valve 14 (supply valve), the hydraulic lifting device 15, and the three-point linkage mechanism 30.

Figure 3A:
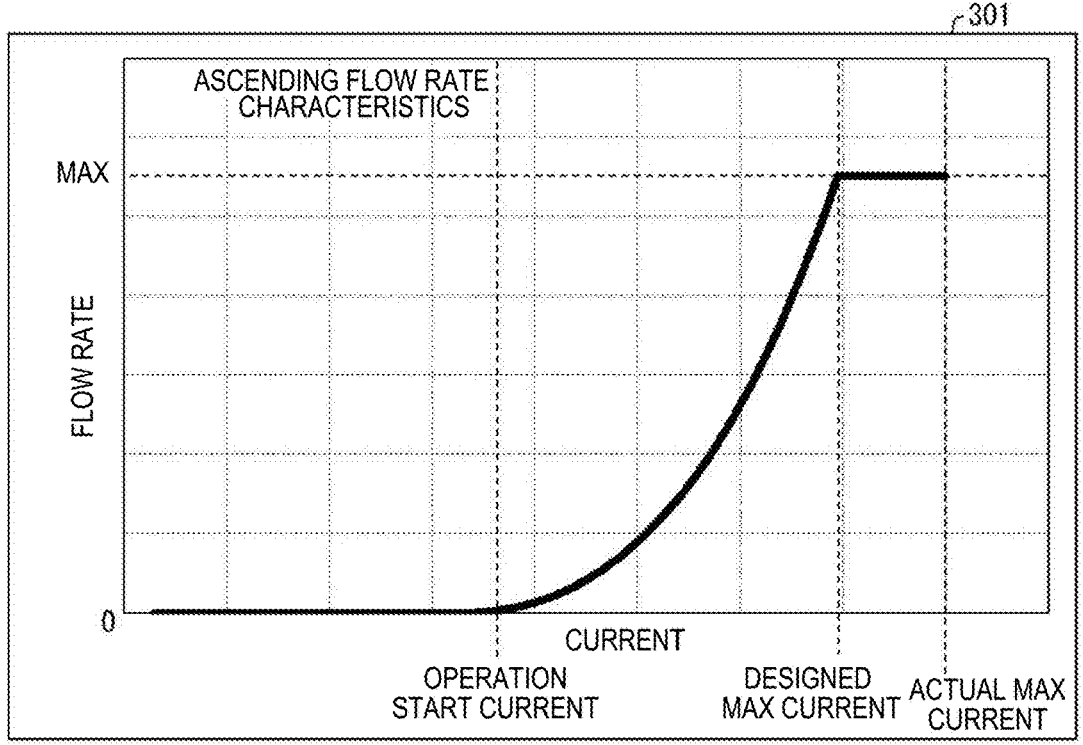
FIGS. 3A and 3B are views illustrating example data stored in a memory.
Figure 3B:
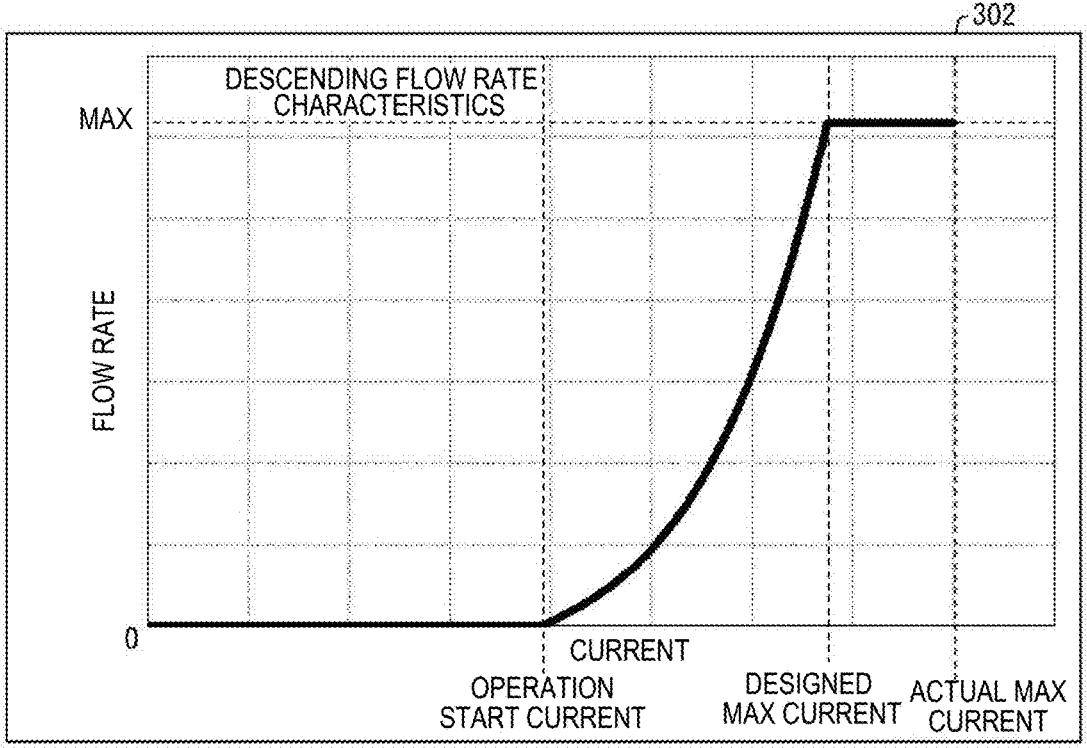

The memory 10 is a memory where data to be used by the tractor 1 is stored, and stores ascending flow rate characteristic data, descending flow rate characteristic data, an ascending restraint current value, and a descending restraint current value. One example of the ascending flow rate characteristic data is illustrated in 301 of FIG. 3A, and one example of the descending flow rate characteristic data is illustrated in 302 of FIG. 3B. Moreover, one example of the ascending restraint current value is illustrated in 303 of FIG. 4A, and one example of the descending restraint current value is illustrated in 304 of FIG. 4B. Ascending flow rate characteristic data 301 of FIG. 3A illustrates a current value given to the control valve 14 normally (ambient temperature) and an amount (flow rate) of oil which flows from the control valve 14 when the hydraulic lifting device 15 raises, and descending flow rate characteristic data 302 of FIG. 3B illustrates a current value given to the control valve 14 normally (ambient temperature) and an amount (flow rate) of oil which flows from the control valve 14 when the hydraulic lifting device 15 lowers (hereinafter, may be referred to as a "current/oil-amount characteristic"). These examples are design data in which the oil begins to be supplied to the hydraulic lifting device 15 from the control valve 14 once an operation start current is provided, and the flow rate which flows from the control valve 14 becomes the maximum at a designed maximum current. As apparent from FIGS. 3A and 3B, the current/oil-amount characteristic differs between raising and lowering of the hydraulic lifting device 15. The oil begins to be supplied at lower current when raising and it reaches the maximum flow rate at lower current when lowering, and the maximum flow rate is about 10%, for example, more when lowering. The maximum current actually given to the control valve 14 (actual maximum current) may be, for example, about 10% to about 20% more than the designed current in consideration of manufacturing variation. In this preferred embodiment, the actual maximum current is set about 15% higher than the designed maximum current, for example.

Figure 4A:
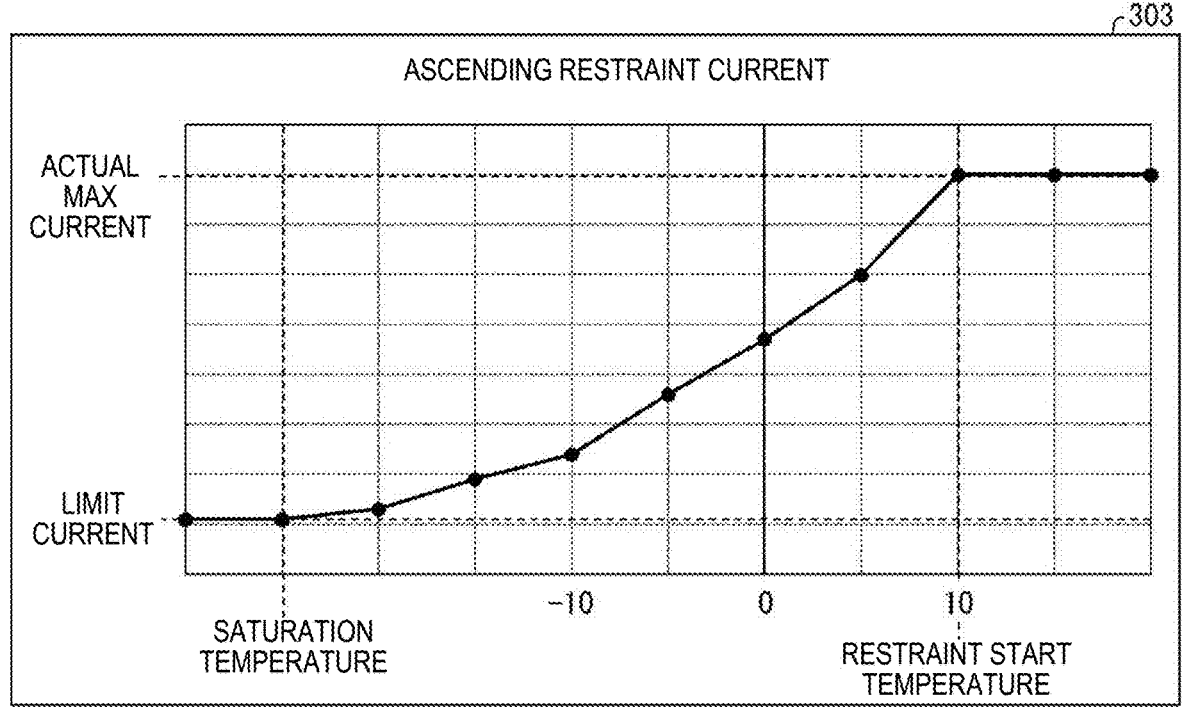
FIGS. 4A and 4B are views illustrating example data stored in the memory.
Figure 4B:
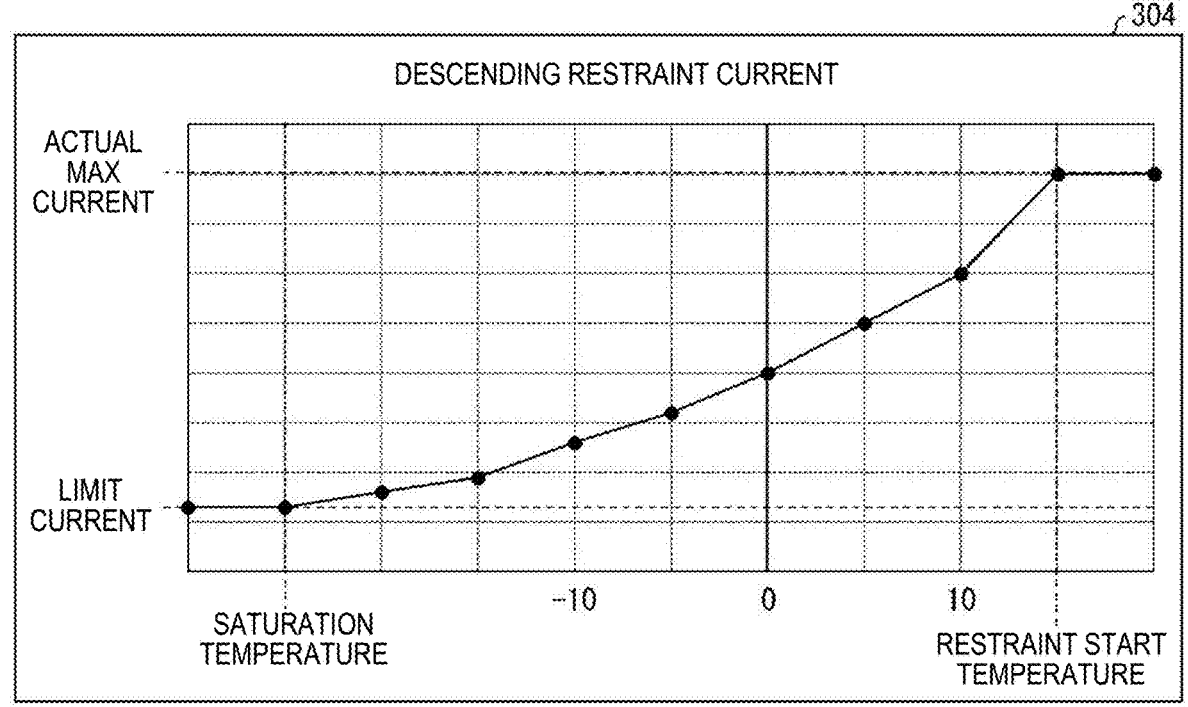

Moreover, an ascending restraint current value 303 of FIG. 4A and a descending restraint current value 304 of FIG. 4B associate the oil temperature with the restraint current value (hereinafter, may be referred to as a "temperature/restraint-maximum-current"), and are referred by a maximum-flow-rate setting part 21 (maximum oil amount setting part) which will be described later. In order to reduce the maximum flow rate of the control valve 14, the actual maximum current is set to a lower value under a low temperature (for example, about 10° C. or lower). In detail, when the temperature at the temperature sensor 13 inside the hydraulic lifting device 15 becomes about 10° C. (in the drawings, described as a "restraint start temperature"), for example, the actual maximum current is restricted for both the raising and lowering of the hydraulic lifting device 15, and the lower current is given to the control valve 14. The actual maximum current is set lower as the temperature decreases. However, since the oil will not flow from the control valve 14 if the current value is set too low, a fixed current (limit current) higher than the operation start current is used when the temperature is lower than a certain saturation temperature. Here, it is set as the limit current about 10% to about 30% higher than the operation start current, for example. Note that, as seen from the drawings, the temperature/restraint-maximum-current differs between the raising and lowering of the hydraulic lifting device 15.

Returning to FIG. 2, the instruction accepting part 11 is an interface which accepts an instruction of a worker. The instruction accepting part 11 may include a touch panel, or may include a physical switch (a control lever, a push button, etc.). For example, the instruction accepting part 11 accepts, from the worker, an instruction to raise the work machine 2, and notifies the instructed content to the lift controller 12. The lift controller 12 controls ascending and descending of the work machine 2 based on the content instructed from the worker through the instruction accepting part 11, and includes the maximum-flow-rate setting part 21 and a valve controlling part 22 (hydraulic drive controller). Note that the lift controller 12 may automatically read the content of work from the memory 10 and perform the control, in addition to when it accepts the instruction to raise the work machine 2 from the worker.

When the ascending-and-descending instruction for the work machine 2 is notified, the maximum-flow-rate setting part 21 acquires the oil temperature from the oil temperature sensor 13, and sets the current value corresponding to the acquired oil temperature as the maximum current value with reference to the ascending restraint current value 303. The maximum current value is not to provide current exceeding this current value to the control valve 14, and corresponds to the maximum flow rate of the control valve 14. For example, referring to FIG. 4, if the oil temperature is about −10° C., the maximum current value is restricted to a value about 40% lower than the actual maximum current value, and the maximum flow rate of the control valve 14 becomes about ⅓ of the maximum flow rate.

Moreover, the maximum-flow-rate setting part 21 may use different maximum current values corresponding to the oil temperature, between raising and lowering the work machine 2. This is because the oil amount suitable for moving the work machine 2 changes due to the influence of the gravity etc. between the raising and lowering the work machine 2.

The valve controlling part 22 transmits to the control valve 14 an instruction to raise and lower the work machine 2 to a position corresponding to the ascending-and-descending instruction accepted by the instruction accepting part 11. In detail, the valve controlling part 22 controls the control valve 14 by giving to the control valve 14 current below the maximum current value set by the maximum-flow-rate setting part 21.

The oil temperature sensor 13 detects a temperature of oil which flows near the control valve 14. The oil temperature sensor 13 is preferably disposed near the control valve 14, and, for example, it is disposed inside the hydraulic circuit of the lower links 32.

The control valve 14 adjusts an amount of oil which flows into the hydraulic cylinder 16 by opening and closing the valve in response to an instruction from the valve controlling part 22.

The detail of the hydraulic lifting device 15 is as described above.

The three-point linkage mechanism 30 is provided with the single top link 31 and the left-and-right lower links 32 as described above, and it raises and lowers the work machine 2 while supporting it by three links.

Figure 5:
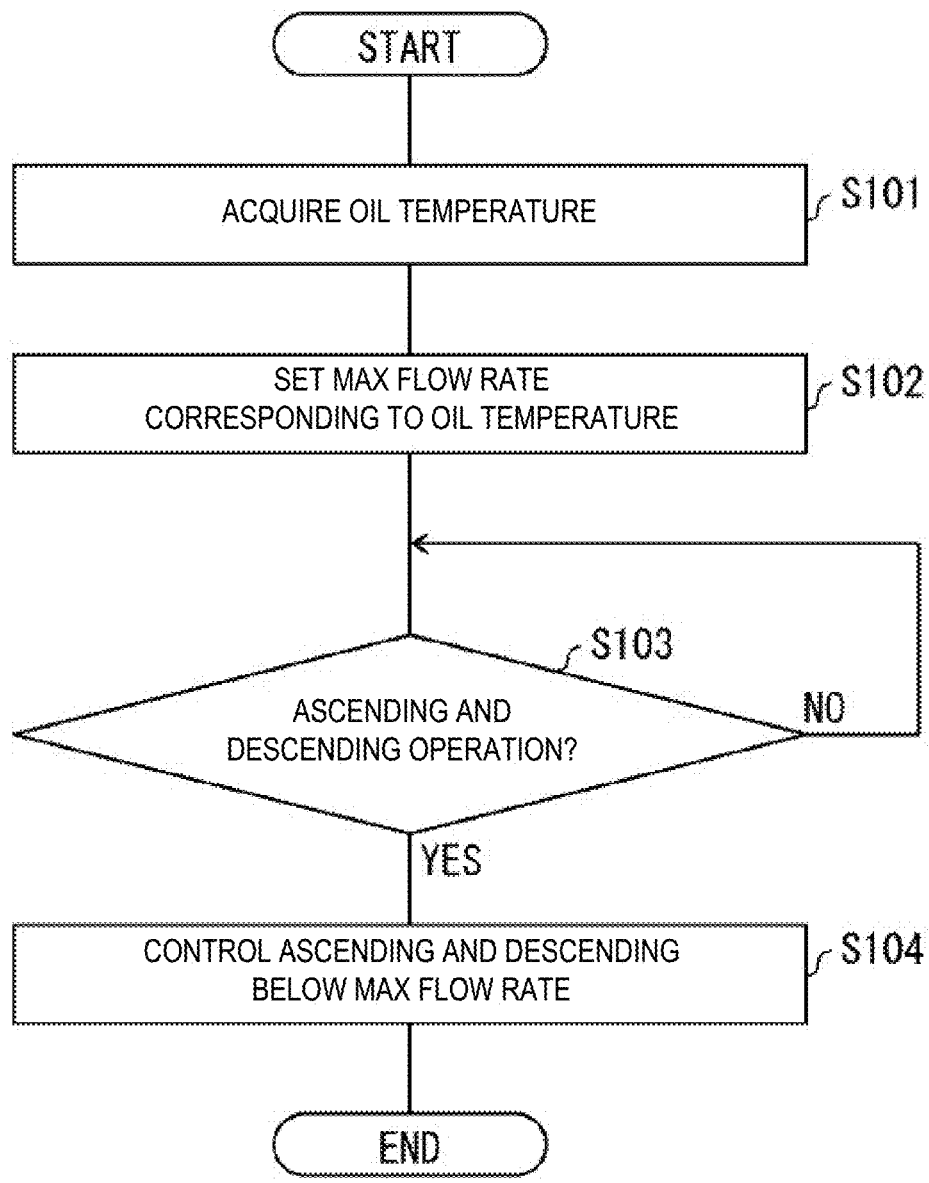
FIG. 5 is a flowchart illustrating a flow of processing of the tractor.

Next, referring to FIG. 5, a flow of processing when the tractor 1 raises and lowers the work machine 2 is described.

FIG. 5 is a flowchart illustrating the flow of processing for ascending and descending the work machine 2.

As illustrated in FIG. 5, the maximum-flow-rate setting part 21 acquires the oil temperature detected by the oil temperature sensor 13, periodically or at a given timing (S101). Note that the acquisition timing of the oil temperature may be a timing at which the instruction accepting part 11 accepts the ascending-and-descending instruction of the work machine 2 from the worker.

Next, the maximum-flow-rate setting part 21 sets the maximum current value corresponding to the oil temperature acquired at Step S101 with reference to the ascending restraint current value 303 (S102). Then, if the instruction accepting part 11 accepts the ascending-and-descending operation of the work machine 2 (YES at S103), the valve controlling part 22 raises and lowers the work machine 2 by controlling the control valve 14 with the current value below the maximum current value set at Step S102 (S104). The above is the flow of the processing when the tractor 1 raises and lowers the work machine 2.

Thus, the tractor 1 according to this preferred embodiment restricts the maximum flow rate of the control valve 14 according to the oil temperature. In more detail, the maximum flow rate is reduced as the oil temperature falls until it reaches the saturation temperature. Therefore, since the maximum flow rate of the control valve 14 falls under the low temperature, it can suppress the impairment in which, when closing the control valve 14, the control valve 14 cannot be fully closed due to the viscosity of the oil.

Preferred Embodiment 2

Below, another preferred embodiment of the present disclosure is described. Note that, for the sake of convenience of the description, the same reference characters are assigned to members having the same functions as the members described in the above preferred embodiment not to repeat the description.

In Preferred embodiment 1, the problem due to the viscosity of the oil is solved by reducing the maximum flow rate of the control valve 14 under the low temperature. However, when the maximum flow rate of the control valve 14 is reduced, since the amount of oil supplied to the hydraulic cylinder 16 decreases, the time required to raise and lower the work machine 2 to the target position becomes longer than the case where the maximum flow rate is not reduced.

Thus, in this preferred embodiment, a selection for giving priority to the accuracy of moving the work machine 2 to the target position (accuracy priority mode) or giving priority to the time required for moving the work machine 2 to the target position (time priority mode) is enabled.

Figure 6:
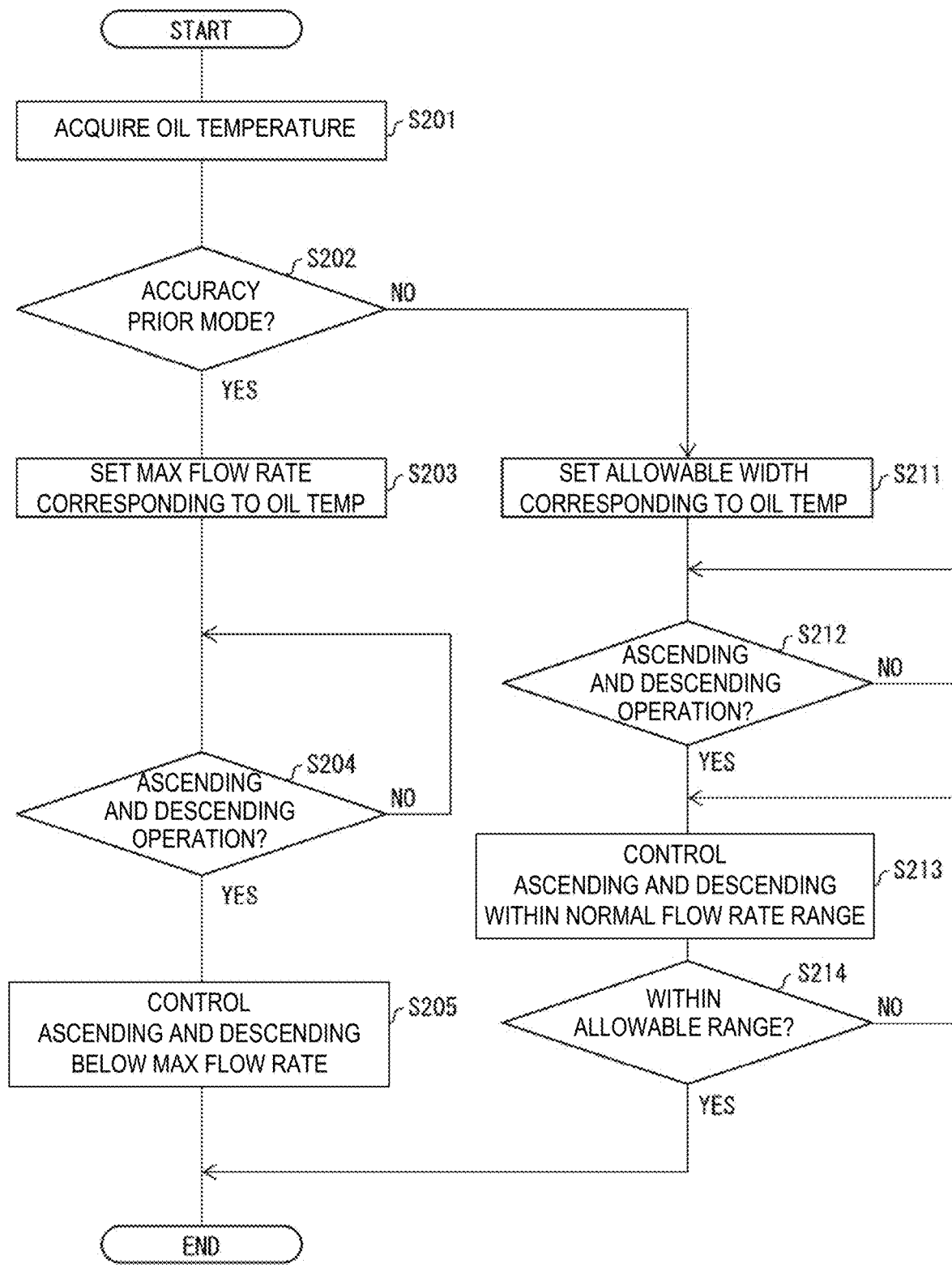
FIG. 6 is a flowchart illustrating a flow of processing of a tractor according to another preferred embodiment of the present invention.

Referring to FIG. 6, a flow of concrete processing is described. FIG. 6 is a flowchart illustrating the flow of the processing when the priority based on either the accuracy or the time is selectable.

As illustrated in FIG. 6, the maximum-flow-rate setting part 21 first acquires the oil temperature detected by the oil temperature sensor 13, periodically or at a given timing (S201). Next, the lift controller 12 determines whether it is in the "accuracy priority mode" (S202). The accuracy priority mode is a mode in which the priority is given to the accuracy of the target position to which the work machine 2 is moved rather than the time required for the movement, and it is set by the worker in advance.

If the lift controller 12 determines that it is in the "accuracy priority mode" (YES at S202), the maximum-flow-rate setting part 21 sets the maximum current value corresponding to the oil temperature acquired at Step S201 with reference to the ascending restraint current value 303 (S203). Then, if the instruction accepting part 11 accepts the ascending-and-descending operation of the work machine 2 (YES at S204), the valve controlling part 22 raises and lowers the work machine 2 by controlling the control valve 14 with the current value below the maximum current value set at Step S203 (S205).

On the other hand, at Step S202, if the lift controller 12 determines that it is not in the "accuracy priority mode" (NO at S202), it sets an allowable width corresponding to the oil temperature (S211). The allowable width is to indicate how much deviation from the target position is permissible. Note that, here, although the allowable width is set corresponding to the oil temperature, the allowable width may set as a constant without depending on the oil temperature.

Then, if the instruction accepting part 11 accepts the ascending-and-descending operation of the work machine 2 (YES at S212), the valve controlling part 22 raises and lowers the work machine 2 by controlling the control valve 14 with the current value corresponding to a range of the normal flow rate (S213). Then, if the raised or lowered position of the work machine 2 is a position within the allowable width from the target position (YES at S214), the ascending-and-descending processing ends.

The above is the flow of the processing for the tractor 1 raising and lowering the work machine 2 when the priority based on either the accuracy or the time can be selected.

Note that, here, although the determination of the allowable width is performed only when operating at the normal flow rate, it may determine whether the position falls within an allowable width similar to the right side Step S214 after the left side Step S205. In this case, the allowable width in the accuracy priority mode may be set narrower than the allowable width in the time priority mode so that the accuracy will not be dropped.

According to the above configuration, when the priority is given to the time, the work machine 2 can be moved near the target position at the fastest speed by providing the allowable width, while reducing the possibility of causing a so-called "hunting." Alternatively, when the priority is given to the accuracy, the work machine 2 can be moved to the target position with sufficient accuracy, while reducing the possibility of causing the hunting, similar to Preferred embodiment 1.

The control block (particularly, the lift controller 12) of the tractor 1 may be implemented by a logic circuit (hardware) in an integrated circuit (IC chip) etc., or may be implemented by software, for example.

In the latter case, the tractor 1 is provided with a computer to execute a command of a program which is software to implement each function. For example, the computer may be provided with at least one processor (control device), and may be provided with at least one computer-readable recording medium which stores the program. The purpose of the present disclosure is achieved by the processor of the computer reading the program from the recording medium and executing the program. As the processor, a CPU (Central Processing Unit) may be used, for example. As the recording medium, a "non-transitory physical medium," such as a ROM (Read Only Memory), as well as a tape, a disc, a card, a semiconductor memory, and a programmable logic circuit, may be used. Moreover, it may further be provided with a RAM (Random Access Memory) which develops the program. Moreover, the program may be supplied to the computer through an arbitrary transmission medium (a communication network, a broadcast wave, etc.) in which the program is transmittable. Note that one aspect of the present disclosure may also be implemented in the form of a data signal embedded in a carrier wave, in which the program is embodied by an electronic transmission.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle comprising:
a hydraulic drive;
a lifting mechanism to control at least one of a height and a posture of a work machine connected to the work vehicle using the hydraulic drive;
an oil-temperature acquirer to acquire an oil temperature to be used for the hydraulic drive;
a maximum oil amount setter to set a maximum oil amount according to the oil temperature acquired by the oil-temperature acquirer, the maximum oil amount being a maximum value of a supply amount of oil used to drive the hydraulic drive; and
a hydraulic drive controller to control the hydraulic drive below the maximum oil amount set by the maximum oil amount setter; wherein
a selection of either one of an accuracy priority in which priority is given to an accuracy of a target position to which the work machine is moved and a time priority in which priority is given to a time required to move the work machine to the target position is possible; and
the maximum oil amount setter is configured or programmed to:
when the accuracy priority is selected, set the maximum oil amount according to the oil temperature.

2. The work vehicle of claim 1, wherein an oil temperature sensor to detect the oil temperature is provided at or in a vicinity of a supply valve to supply the oil to the hydraulic drive.

3. The work vehicle of claim 2, wherein the oil temperature sensor is in a hydraulic circuit to drive the hydraulic drive.

4. The work vehicle of claim 1, wherein the maximum oil amount setter changes the maximum oil amount corresponding to the oil temperature between when raising the work machine and when lowering the work machine.

5. The work vehicle of claim 1, wherein
the maximum oil amount setter is configured or programmed to:
when the time priority is selected, set an allowable range permissible from the target position; and
the hydraulic drive controller is configured or programmed to:
when the accuracy priority is selected, control the hydraulic drive below the maximum oil amount set by the maximum oil amount setter; and
when the time priority is selected, control the hydraulic drive so that the work machine moves within the allowable range at a normal oil amount.

* * * * *